Dec. 1, 1936. F. C. P. HENROTEAU Re. 20,187

TELEVISION

Original Filed May 29, 1929 2 Sheets-Sheet 1

INVENTOR
FRANCOIS C. P. HENROTEAU.

BY Smart & Biggar ATTYS.

Dec. 1, 1936. F. C. P. HENROTEAU Re. 20,187

TELEVISION

Original Filed May 29, 1929 2 Sheets-Sheet 2

INVENTOR
FRANCOIS C. P. HENROTEAU

BY Smart & Biggar
ATTY'S.

Reissued Dec. 1, 1936 Re. 20,187

UNITED STATES PATENT OFFICE 20,187

TELEVISION

François Charles Pierre Henroteau, Ottawa, Ontario, Canada, assignor to The Electronic Television Company, Limited, Ottawa, Ontario, Canada Original application May 29, 1929, Serial No. 367,084. Divided and application September 8, 1930, Serial No. 480,480. Patent No. 1,903,112, dated March 28, 1933. This application for reissue October 31, 1933, Serial No. 696,898. In Canada May 16, 1929

40 Claims. (Cl. 178—6)

This invention relates to television and is a division of my copending application Serial No. 367,084, now Patent No. 1,903,112, granted March 28, 1933.

One object of the invention is to transmit either by wire or by radio the moving images of scenes under ordinary illumination and at the same time provide that the image transmitted be exceedingly sharp and well defined, showing even the smallest details.

Another object of the invention is to permit the transmission of animate or still views under ordinary daylight illumination regardless, within limits, of the size of these views, that is to transmit all views which it is possible at present to photograph with a moving picture camera.

A further object of the invention is to provide a method whereby each point of the scene to be televised can be impressed on the photoelectric surface for a far greater time than has hitherto been possible.

A still further object of the invention is to provide a method whereby all the points of the scene to be televised are simultaneously projected on the transmitter and not successively projected thereon, as is the case with all practical methods of television now in use.

In all methods of television used at present the scene to be televised is divided into a number of elements according to the amount of detail required in the scene received. Each of these elements is then successively projected on the photoelectric transmitting cell and sent to the receiving station. My method, however, differs radically from the above method in that all the elements of the scene are simultaneously projected on the transmitter. If, according to known methods, it is desired to transmit an entire scene every sixteenth of a second and the scene is to be divided into ten thousand elements, then each element will be projected on the transmitting screen for only one one-hundred and sixty thousandths of a second.

It is known that the electric energy liberated by photoelectric material is proportional to the amount of light falling on this material multiplied by the time during which this light acts. If, therefore, each element of the scene is to remain on the transmitter for only one one-hundred and sixty thousandths of a second, a very strong illumination of this scene is necessary in order that the photoelectric material may emit enough energy for transmission and, for this reason, it is at present practically impossible to transmit scenes under ordinary daylight illumination. According to my method, transmission is divided into three periods of equal length, the scene being projected on the transmitter during one of these periods.

Since all the elements of the scene are simultaneously projected on the transmitter, the light from each element of the former falls on the latter for one third of one sixteenth of a second, that is for almost four thousand times longer than in known methods. If, however, the number of elements into which the scene is divided increases, then this proportion becomes still greater. In order to transmit the scene a very strong spot of light is caused to scan the entire surface of the transmitting screen on which the scene has been projected. The time for which this scanning beam will act upon one element of the transmitter will be ten thousand times shorter than the time for which the light of the scene acts upon the same element. However, the light of the scanning beam can be made, on the average, ten thousand times greater than the light received from the scene. Therefore, the electric energy liberated from one element of the photoelectric material of the transmitter will be of the same order of magnitude as the energy liberated by the light of the scene which strikes that element. Thus, assuming the same illumination of the scene in transmission by my method and transmission by all other known methods, the energy available for the transmission of the scene by my method will be, on the average, a number of thousand times greater than the energy available for the transmission of the scene by all known methods.

It will be seen that by the use of my method, daylight television is made quite possible and, since the particular form of transmitting screen which I use may be divided into a very large number of elements, a great wealth of detail in the transmitted scene is made possible.

According to my invention, the apparatus for carrying out the method comprises a photoelectric cell having a photoelectric coating on a certain portion of the interior thereof and having a cathode, the surface of which consists of a very great number of small elements of photoelectric material insulated one from the other. An anode is provided in the cell and a grid interposed between the anode and the cathode.

Opposite the face of the cathode above described, a transparent window is formed in the cell through which both the view and the scanning beam are projected onto the surface of the cathode. Transmission is divided into three stages and is carried out as follows:

A. A strong, comparatively wide beam of light of a certain wave length is projected parallel to the cathode and strikes the coating of photoelectric material with which the cell is provided on its interior. This light is of such a wave length that the electrons which it detaches from the photoelectric material will have a velocity of expulsion of almost zero. During this operation the grid and anode are grounded so that the electrons emitted by the beam of light will be directed to any of the elements or groups of elements of the cathode which have a positive potential. Thus, at the end of this operation, all the groups of elements of the cathode will be at practically a uniform potential.

B. The grid and anode are connected to a source of positive potential and the view is projected onto the surface of the cathode. According to the intensity of the light striking each element or set of elements, these will emit more or less electrons and will become more or less positive. The electrons emitted by the cathode will be absorbed by the grid or the anode.

C. The grid is connected to a source of comparatively low negative potential and the anode to a source of positive potential and to the grid of the first three-electrode tube of a transmitter. A scanning beam of very strong light is then caused to pass over the surface of the cathode. Under the influence of this beam the anode will receive more or less electrons from the elements or groups of elements according as these are less or more positive. Thus modulations will be impressed on the grid of the first three-electrode tube of the transmitter, which modulations will correspond to the degree of positive potential to which the elements or groups of elements have been raised. Thus in the last analysis, the modulations impressed on the transmitter are proportional to the intensity of the light of the particular part of the view to which they correspond.

My invention will be more fully understood by reference to the attached drawings in which.

An important fact of which I have taken advantage in this invention is that the maximum velocity with which electrons are expelled from photoelectric material will be different for lights of different colours which strike this material. The nearer the violet, the greater the velocity, and for a certain colour nearer the red the velocity of expulsion will be zero.

Theoretically the law of photoelectric activity expressing the maximum kinetic energy that can be imparted to an electron leaving a photoelectric material under the influence of light is expressed by the formula $$\tfrac{1}{2}mv^2 = h(V = V_0)$$

where $v$ is the velocity of expulsion of the electron, $m$ its mass, $h$ is Planck's universal constant and equal to $6.55 \times 10^{-27}$ erg. sec., $V$ is the frequency of the light striking the photoelectric material, and $hV_0$, also written $w_0$, is a constant called the electron affinity, varying with the nature of the photoelectric metal; it is the minimum energy necessary to tear off an electron from the atom of this metal.

From the above formula it can be seen that when $V = V_0$ the maximum velocity of expulsion of the electron is zero; that is for light of that particular wave-length or colour a number of electrons become just barely detached from their atom. When $V$ is smaller than $V_0$ there is no emission of electrons and when $V$ is somewhat larger there is emission of some electrons with a very small velocity of expulsion.

For potassium the colour for which $V = V_0$ is somewhere in the green region. In the violet, the velocity of expulsion has a fairly large value. Light near the particular colour for which $V = V_0$ is used is my invention, as will be seen in its mechanisms.

The law of photoelectric activity to which I have referred is fully discussed in any of the following works to which reference may be had:—Dictionary of Applied Physics by Richard Glazebrook, vol. II, page 594. Photo-Electricity by H. Stanley Allen, page 142. The Voltage Current Relation in Central Anode Photoelectric Cells by H. E. Ives and T. C. Fry. Astrophysical Journal, 1922, vol. 56, page 1.

Figure 1:
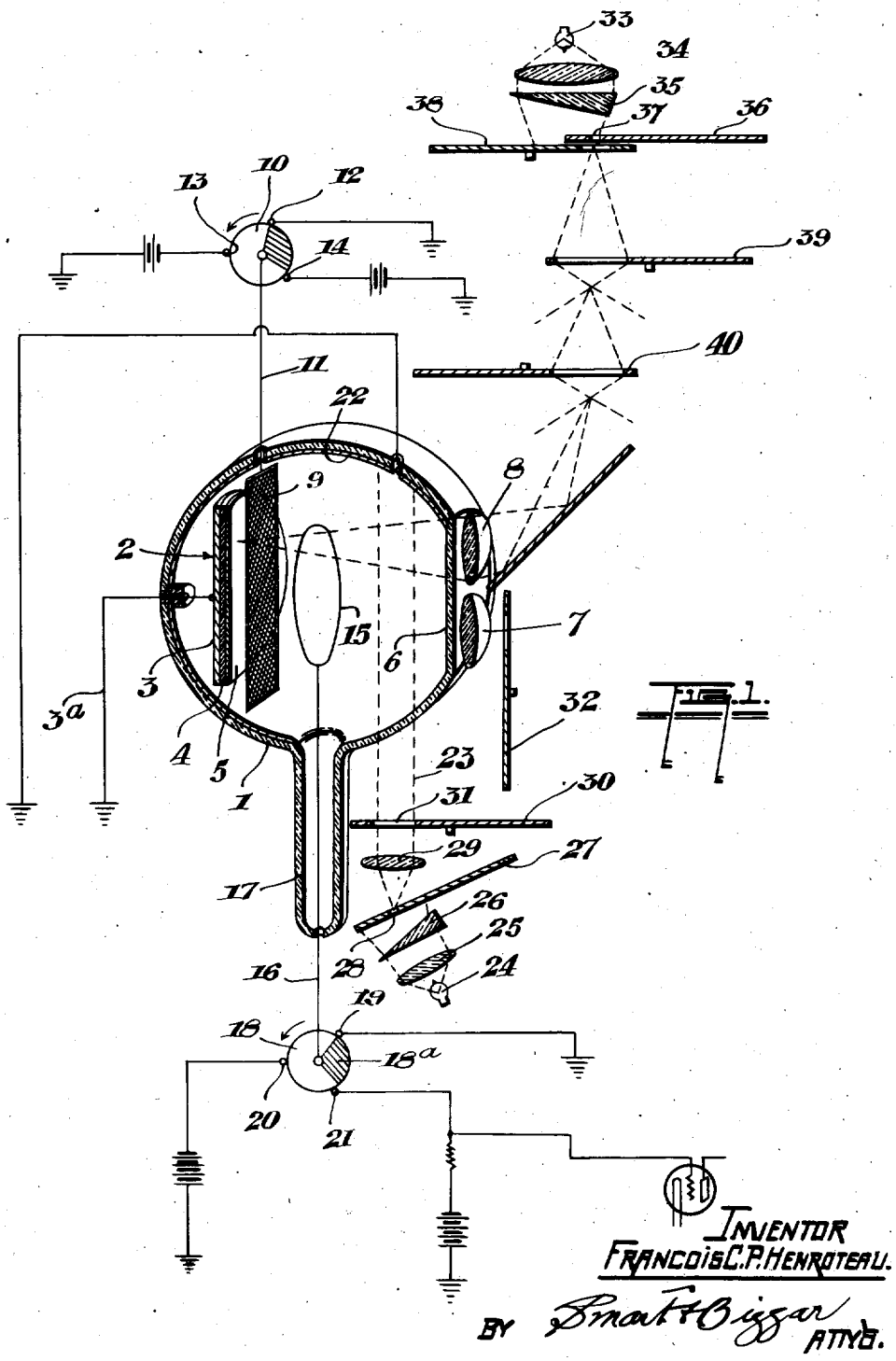
Figure 1 is a sectional perspective and diagrammatic view illustrating the apparatus employed and showing certain of the electrical connections.

Proceeding to the description of the various parts of the apparatus:

In Fig. 1, 1 indicates a suitable photoelectric cell in the form of a vitreous or glass container exhausted to a high degree of vacuum in the manner known in the art; 2 indicates generally the cathode located at the back part of the container. This cathode may comprise a metallic plate 3 grounded through a suitable conductor 3a which passes through the wall of the container and is suitably sealed therein. Upon the plate 3 is placed a layer of some insulating material 4 such as aluminum or magnesium oxide and upon this is placed a layer 5 of potassium or other photoelectric material, subdivided into tiny elements insulated one from the other. These insulated elements could be pure potassium globules formed in a layer of insulating potassium hydride.

The photoelectric material, such as potassium, is evaporated on the aluminum oxide, or other insulating medium and treated so as to form a colloidal deposit of potassium hydride containing minute globules of pure potassium. Such a coating of photoelectric material has been prepared before by V. K. Zworykin (see United States Patent No. 1,691,324, November 13, 1928, page 2, lines 1 to 9). The globules are really insulated one from the other and each of them constitutes so to speak a minute and very active photoelectric cell.

The surface 5 might also be prepared by bombarding with cathode rays a very thin layer of potassium hydride; these rays having passed through a very fine sieve transform elementary areas of the screen into groups of fine globules of pure potassium. Also, sodium, caesium or rubidium hydride might be used.

The portion of the photoelectric cell 6 opposite the cathode 2 constitutes a window and may be formed with a relatively plane surface through which light may be projected by the lenses 7 and 8, which lenses will be suitably mounted in relation to the photoelectric cell with the usual provision for adjusting or focusing. The surface 5 should be arranged to coincide with the focal plane of the lens 7, which lens of course could be moved back and forth in order to focus all pictures or scenes at various distances in front of the apparatus.

The grid 9 which is positioned within the photoelectric cell between the cathode and the anode consists of a fine screen formed of thin wire. Means are provided for making various electrical connections to the grid. These comprise a commutator 10 driven at a suitable speed as hereafter described. This commutator is of insulating material but is formed with a metallic sector the arc of which subtends an angle at the centre of the commutator of a little less than 120°. A conductor 11 connects the grid to the metallic sector of the commutator. Arranged around the periphery of the latter and spaced 120° from each other are contacts 12, 13 and 14 which are connected respectively to ground, a source of moderate positive potential and a source of moderate negative potential.

15 indicates the anode located within the cell at about the centre thereof. The anode is in the form of a wire loop arranged in a plane parallel to the cathode element 2 and is connected to a conducting wire 16 which extends outwardly through the extension 17 of the cell, and is sealed therein.

Provision is made for making various electrical connections to the anode, this being accomplished by a rotatable commutating element 18 driven at a suitable speed as hereinafter described.

The commutator 18 is of insulating material and, like the commutator 10, is formed with a metallic sector 18*a* to which the conductor 16 is connected, the angle at the centre of this metallic sector being a little less than 120°. Suitable contacts 19, 20 and 21 are arranged about the commutator 18 and spaced 120° apart from each other. The contact 19 is connected to ground, the contact 20 to a source of positive potential, while the contact 21 is connected to a li source of positive potential and also to the grid of the first three electrode valve of a transmitter.

The interior of a large part of the photoelectric cell 1 is coated with a coating 22 of photoelectric material such as potassium. The coating is designed to be affected at intervals as hereinafter described by an energizing beam of light 23, this preferably passing through one side of the cell at a direction substantially parallel to the plane of the cathode so as not to strike the latter. This beam of light is interrupted at intervals and is of such colour that the frequency of the colour is somewhat larger than the frequency $V_0$ for which electrons are merely detached from the photoelectric material. The electrons emitted have then a very small velocity of expulsion and if all the objects inside the cell are at zero potential except certain of the elements of cathode surface 5, then all these electrons will be captured by the former.

The drawings illustrate a convenient method of producing this beam of light from a very strong source of light 24, such as an arc lamp or a pointolite lamp of high candle power. This light, after passing through lens 25 and prism 26, forms a spectrum in the plane of the screen 27 which has a narrow aperture or slit 28 which allows light of the desired wave length to pass, which light after passing through the lens 29 forms the beam 23 which strikes the interior of the photoelectric cell.

Other known methods of obtaining a coloured beam such as the use of a coloured screen of Iena glass might be used if necessary. Also, if necessary to increase the intensity of the beam, a bank of several lamps 24 might be used.

Figure 2:
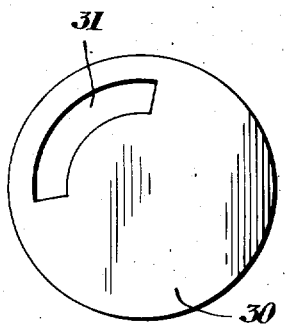
Figure 2 is a plan view of a form of disc which may be used to interrupt either the view of the scene, the scanning or the strong beam of light used to bring the receiving screen nearly to zero potential.

To interrupt the beam 23 at intervals, a rotating disc 30 is provided, the form of which may be as shown in Fig. 2, the disc being formed with a segmental aperture 31 covering an arc of somewhat less than 120°. This disc is rotated very rapidly and at each revolution the aperture is designed to permit the beam of light to strike the surface of the photoelectric cell for approximately 1/50 of a second.

The image of the view to be televised is formed on the cathode by any convenient lens system. I have illustrated lens 7 designed to form such an image. Associated with this lens are means for interrupting the light which forms the image, this interruption being conveniently accomplished by a rotating disc 32 of similar form to the disc 30 and rotating at the same speed.

Means are also provided for scanning the surface 5 of the cathode with extreme rapidity. The means which I provide for the purpose include a lens 8 which allows a spot of light to scan the surface 5. While various known methods of scanning may be used with other parts of the apparatus therein described, the following scanning means will be found to possess special utility.

These scanning means include a suitable concentrated source of light 33 such as a bright pointolite or arc lamp having brightness as great as 1,000 candle power. Where it is desired to use light of a short wave length, the arrangement described with respect to the reduction of the beam 23 may be used, such a short wave length being of advantage in order to obtain a large velocity of expulsion for the electrons emitted by the surface 5 of the cathode.

Figure 3:
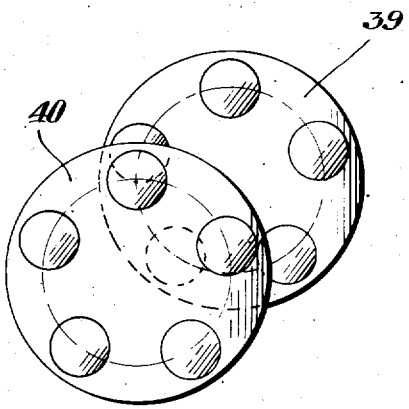
Figure 3 is a plan view of the two orthogenal scanning lens discs.

Assuming, therefore, that it is desired to produce light of a certain colour, there is provided for this purpose a lens 34 suitably arranged with respect to the light source 33 and designed to project a beam through a prism 35 from the spectrum of which the light of the desired colour will be selected by a screen 36 having a suitable aperture 37 therein. The light passing through the aperture 37 is interrupted by a rotating disc 38 similar in form to the disc 30 and rotating at the same speed. The three discs 30, 32 and 38 are all rotated at the same speed and are so arranged with respect to each other that they allow the respective beams of light, which they control, to pass one after the other. For instance, the light coming from the disc 30 will pass 1/50 of a second; then the beam from the disc 32 will pass also 1/50 of a second; finally, the beam from the disc 38 will pass for 1/50 of a second. The beam from the disc 38 also passes through certain lenses inserted in the two rotating discs 39 and 40 which are arranged one above the other and in overlapping relation, as indicated in Figure 3.

Each disc carries a plurality of lenses and they are so arranged with respect to each other that when a lens of one is superimposed on a lens of the other, the respective directions of motion are at right angles when they cross each other. The disc 39 is rotated rather slowly while the disc 40 is rotated at a much higher speed.

The discs are so placed and the focal lengths of their lenses are so computed that the real image of the point of light from the light source 33 is formed on the surface 5 of the cathode.

Care should also be taken that the beam of light coming from any lens of either of the discs 39 or 40 shall form a cone of much wider angle than the cone formed by the beams of light entering these lenses or entering the lens 8. This is to ensure that the point of light, which is the image of light source 33, remains constant in brightness as it is impelled to scan the surface 5 by the rotation of the two discs.

By modifying the focal length of the lenses, and increasing the brightness of the light source 33, the scanning spot on the surface 5 may be rendered extremely small and intensely bright; moreover, the successive lines of the scanning on this screen will be exceedingly close to each other in proportion to the speed of the disc 40 with respect to that of the disc 39.

All the various discs may be conveniently driven from a single source of power such as a motor, the discs 30, 32, 38 and commutators 10 and 18 having the same speed of rotation.

In order to permit the scanning arrangement and light filtering device associated with the light source 33 to be arranged in a vertical direction above the photoelectric cell, it may be convenient to use a mirror 41 to deflect the light coming from the disc 40 through the lens 8.

Having thus described the various parts of this invention, the working method of the system is as follows:

To begin, no light enters lens 7 or lens 8, and anode 15 and grid 9 are grounded. Then occurs a rapid succession of operations:

(a) For the small fraction of a second that anode 15 and grid 9 are grounded, an extremely strong and wide beam of light 23 passes through the opening in disc 30 and strikes the photoelectric surface 22. The colour of this light corresponds to a frequency slightly larger than $v_0$, as explained above. The surface 22 under this treatment will emit electrons having an extremely small velocity of expulsion. If any of the potassium globules or groups of globules of the surface 5 of the cathode 2 are at a positive potential, they will attract some of the electrons and drop to a potential very nearly zero. Really the potential of the different globules will vary. Some of them will have a very slight positive potential owing to their not having attracted enough electrons. Others will be at a very slight negative potential owing to some stray electrons having hit them even though not attracted by them. It may be said, however, that the potential of surface 5 attains practically a uniform value which is almost zero.

Any electrons emitted which are not absorbed by the globules will either fall back on 22 or remain in the cell to be absorbed rapidly by grid 9 or anode 15 as soon as they become positively charged during the next operation.

(b) The beam light 23 is interrupted, grid 9 and anode 15 come into connection with a source of positive potential through the contacts 13 and 20 respectively and for the fraction of a second the opening in the disc 32 allows the image of the scene to be formed on the surface 5 of the cathode 2. The photoelectric globules which receive more light will send out more electrons, and consequently will become charged more positively than the globules which receive less light. All the electrons sent out will be absorbed by either grid 9 or anode 15 on account of the positive potential to which these latter are raised.

(c) The view is interrupted by disc 32. The grid 9 is connected to a source of moderate negative potential while the anode 15 is connected to a source of fairly high positive potential and the grid of the first three-electrode valve of the transmitter. By means of the discs 39 and 40, a spot of very bright light is caused to scan the entire surface 5 of the cathode 2, thus detaching electrons from the successive elements of the latter.

The potential of the grid and anode are so arranged that if an elemental area of zero potential is struck by the scanning beam, then all the electrons detached will be received by the anode. If, on the other hand, an elemental area having a positive potential slightly greater than any positive potential which could be caused by the view is struck by the scanning beam, then no electrons will pass from this area to the anode. Between these two values the number of electrons reaching the anode will vary according to the potential of the element from which they are detached. As the anode receives more or less electrons, its potential will change and modulations will be imposed on the grid of the three-electrode valve of the transmitter. From this point, the transmission is carried on by known methods.

Under the influence of the scanning beam my device functions in effect similarly to a three-electrode valve except that conditions are reversed. In a three-electrode valve, filament potential is constant while grid potential varies. If my cathode be considered as the filament, then, in my cell, filament potential varies while grid potential remains constant.

Evidently the reproduced image will be a negative of the scene, but in the process of amplifying it is easy to transform it again into a positive.

Immediately after lens 8 is closed, the series of operations (a), (b), (c), is repeated again many times. Every time operation (a) brings all the photoelectric globules to nearly the same small potential.

If operation (a) lasts 1/50 second, (b) 1/50 second and (c) 1/50 second, the image produced on the receiving screen will apparently be a non-interruped moving picture.

If, by an optical system, identical images are thrown upon three cells similar to the cell 1, the first made with potassium hydride, the second with caesium hydride and the third with rubidium hydride, each cell commanding one of three overlapping images at the receiver and the respective images being produced by sources of light at different wave lengths such as violet, green and red light, then the image will be received in its natural colours.

Also, if a cell similar to 1 is used, but in which disc 32 rotates more slowly, very faint images of still objects formed on surface 5 could be transmitted to a nearby receiver which would give a very strong, enlarged, and contrasted image of the object, owing to electric amplification. The instrument could, for instance, be attached to a powerful astronomical telescope and while the image focussed would be large and weak, a very vivid strong image would appear in the receiver, by having a scanning mechanism geared to the scanning mechanism of the transmitter in order to eliminate difficulties of synchronization. It could also be attached to a microscope and permit hitherto invisible objects to be seen.

Various modifications may be made in the invention without departing from the spirit thereof or the scope of the claims and, therefore, the exact forms shown are to be taken as illustrative only and not in a limiting sense, and I desire that only such limitations shall be placed thereon as are imposed by the prior art or are specifically set forth in the appended claims.

I claim:—

1. In a television process, the steps which comprise projecting an image upon a photoelectric screen then interrupting the light beam forming the image on the screen and then scanning the screen.

2. In a television process according to claim 1, the step which comprises indirectly bringing the sensitive screen to a uniform potential by means of a beam of light.

3. In a television process, the steps which comprise bringing a sensitive screen to a uniform potential by projecting a beam of light on a photoelectric electrode different from the screen, then projecting an image on the screen, and then scanning the screen.

4. A method of television which comprises first energizing the photoelectric surface of a limited area, then sensitizing the said photoelectric surface with an image of a view, then traversing said surface with a scanning beam of strong illumination and causing the photoelectric values to be impressed upon a transmitting medium and repeating these steps in the transmission of each individual image.

5. The method of television which comprises projecting an image of a scene on the sensitized cathode of a photoelectric cell, then scanning the cathode to cause the latter to send a modulated electronic current to the anode, the said anode being connected to the transmitting medium only when the scanning beam strikes the photoelectric area, then closing the window of the cell, disconnecting the anode from the transmitting medium and then causing the elements of the cathode to assume a uniform potential.

6. In a television method, the following steps comprising subjecting a sensitized surface different from the cathode to a strong beam of light, then interrupting the beam of light, applying a potential to the anode, forming an image of the scene on the cathode, then subjecting the cathode to a scanning beam of light after connecting the anode to an amplifier.

7. In a television process, the herein described steps which comprise projecting an image upon a photoelectric screen, then interrupting the beam of light producing the said image, then scanning the screen with a light beam independent of that which produced the image while the anode is connected to an amplifying system.

8. Television apparatus comprising a photoelectric cell having a sensitized cathode formed of photoelectric elements insulated one from the other, a grid, an anode, a window, and an additional grounded photoelectric surface, means for producing an interrupted beam of light to form an image on the cathode, means for producing an interrupted beam of light for indirectly energizing the cathode by striking the additional surface and means for producing an interrupted scanning beam of light.

9. Television apparatus comprising a photoelectric cell having a sensitized cathode, a grid and an anode, a window, and an additional photoelectric surface, means for producing an interrupted beam of light to form an image on the cathode, means for producing an interrupted beam of light striking the additional photosensitive surface for indirectly energizing the cathode, means for producing an interrupted scanning beam of light, means for connecting the anode successively to ground, to a source of positive potential, and to an amplifying system.

10. Television apparatus comprising a photoelectric cell having a sensitized cathode formed of a large number of photoelectric elements, a grid, an anode, a window, and an additional grounded photoelectric surface, means for producing an interrupted beam of light to form an image on the cathode, means for producing an interrupted beam of light for indirectly energizing the cathode, means for producing an interrupted scanning beam of light and means for connecting the anode to an amplifying system.

11. Television apparatus comprising a photoelectric cell having a sensitized cathode, a grid, an anode, a window, and an additional grounded photoelectric surface, means for producing an interrupted beam of light to form an image on the cathode, means for producing an interrupted beam of light striking the additional surface for energizing the cathode, means for producing an interrupted scanning beam of light and means for intermittently connecting the anode to an amplifying system.

12. Television apparatus comprising a photoelectric cell having a sensitized cathode, a grid, an anode, a window, and an additional photoelectric electrode, means for producing an interrupted beam of light to form an image on the cathode, means for producing an interrupted beam of light striking the additional electrode for energizing the cathode, means for producing an interrupted scanning beam of light, means for connecting the anode intermittently to ground, to positive potential, and to an amplifying system.

13. In television apparatus, a photoelectric cell comprising an evacuated vessel having a window at one side and a photoelectric cathode at the opposite side, a grid adjacent to the cathode, an anode between the grid and the window, a coating of photoelectric material on the inside of the cell, means for projecting a beam of light through the evacuated vessel and against the said coating, a lens system for forming an image of the scene through the window and on the cathode and a lens system for producing a scanning beam of light through the window and on the cathode.

14. The method of television transmission which comprises storing up electric energy in each of a multiplicity of mutually insulated photoelectric elements supported by dielectric material, by the action of the light of corresponding parts of an image of a view to be transmitted, said action being simultaneous for all the elements, causing a scanning spot successively to affect each or small groups of said photoelectric elements while maintaining the insulating properties of the dielectric material substantially constant to liberate an electric flow controlled in intensity at any given instant by the amount, as modified during previous moments by the scanning spot itself and by existing leakages, of electric energy stored up in the photoelectric element or elements affected at this instant by the scanning spot, and impressing said electric flow upon a transmitting medium.

15. Television apparatus comprising a highly evacuated cell, a surface within said cell composed of a multiplicity of mutually insulated photoelectric elements, means for causing the light of each part of a focussed image of a view to be transmitted to act upon a corresponding photoelectric element thus to store up electric energy in said element, the action being simultaneous for all elements, means for causing a scanning spot successively to affect each or small groups of said photoelectric elements, to liberate an electric flow controlled in intensity at any given instant by the amount, as modified during previous moments by said scanning spot itself and by existing leakages, of electric energy stored up in the photoelectric element or elements affected at this instant by said scanning spot, and means for impressing said electric flow upon a transmitting medium.

16. The method of television transmission which comprises storing up electric energy in each of a multiplicity of mutually insulated elements capable of electron emission, by the photoelectric action of the light of corresponding parts of a focussed image of a view to be transmitted, said action being simultaneous for all the elements, causing a scanning spot of light successively to affect each or small groups of said elements and to liberate an electric flow controlled in intensity at any given instant by the amount, as modified during previous moments by the scanning spot itself and by existing leakages, of electric energy stored up in the element or elements affected at this instant by the scanning spot, and impressing said electric flow upon a transmitting medium.

17. Television apparatus comprising a cell, a surface within said cell composed of a multiplicity of mutually insulated elements capable of electron emission, means for causing the light of each part of a focussed image of a view to be transmitted to act photoelectrically upon a corresponding element, thus to store up electric energy in said element, the action being simultaneous for all elements, means for causing a scanning spot of light successively to affect each or small groups of said elements and to liberate an electric flow controlled in intensity at any given instant by the amount, as modified during previous moments by said scanning spot itself and by existing leakages, of electric energy stored up in the element or elements affected at this instant by said scanning spot, and means for impressing said electric flow upon a transmitting medium.

18. The method of detecting an image in unit areas with a light sensitive device comprising combining the activity of said device produced by the light of an image projected on said device with the activity produced by a beam of light projected on a unit area thereof, the activity of each unit area being determined by the light intensity of the image on that area.

19. The method of transmitting pictures of objects electrically, comprising obtaining an image of said object on the cathode of a photoelectric cell, scanning the image on said cell with a ray of light, and transmitting the variations in current produced by said scanning ray.

20. In a television system, a light sensitive device, means for producing an electrostatic image of an object on said device, and means for scanning the image on said device with a searching ray of light.

21. The method of transmitting images of objects electrically with a light sensitive device, comprising producing an electrostatic image of said object upon said device and scanning the image on said device with a ray of light.

22. In a system for the transmission of electrical impulses, characterized by the light and shade intensities of a scene, a scanning ray of light and means for combining the activity of the reflected light of the image of said scene and of said scanning ray of light to generate said electrical impulses.

23. Television apparatus comprising a cell, a surface within said cell composed of a multiplicity of mutually insulated photoelectric elements supported by dielectric material, means for causing the light of each part of a focussed image of a view to be transmitted to act upon a corresponding element, thus to store up electric energy in said element, the action being simultaneous for all elements, means for causing a scanning spot successively to affect each of small groups of said elements while maintaining the insulated properties of the dielectric material substantially constant, and to liberate an electric flow controlled in intensity at any given instant by the amount, as modified during previous moments by said scanning spot itself and by existing leakages, of electric energy stored up in the element or elements affected at this instant by said scanning spot, and means for impressing said electric flow upon a transmitting medium.

24. The method of electrical image transmission which comprises storing up electric energy simultaneously in a plurality of elements capable of electron emission and supported by dielectric material, by the action of the light of corresponding elemental areas of an image to be transmitted, and causing each or small groups of said elements successively to control the intensity of an electric flow in accordance with the electric energy stored up in them, while maintaining the insulated properties of the dielectric material substantially constant.

25. A method of electrical image transmission which comprises projecting the light of a plurality of elemental areas of an image simultaneously on a plurality of mutually insulated elements supported by dielectric material to cause each element to emit electrons and thus acquire a stored charge of a value dependent on the amount of light striking it from the corresponding elemental area of the image, and causing each or small groups of said elements successively to control the intensity of an electric flow in accordance with their stored charges, while maintaining the insulating properties of the dielectric material substantially constant.

26. A method of electrical image transmission which comprises projecting the light of a plurality of elemental areas of an image on a plurality of mutually insulated elements capable of electron emission to change the charge of each element from an initial value to a value dependent upon the amount of light striking it from the corresponding elemental area of the image, causing each or small groups of said elements successively to control the intensity of an electric flow in accordance with their changed charges, and restoring the charge of each element to substantially its initial value by directly flooding the element with electrons.

27. The method of electrical image transmission which comprises projecting the light of a plurality of elemental areas of an image simultaneously on a photosensitive member to cause electron emission therefrom, producing an electrical image comprising a plurality of separate and distinct electrostatic charges on insulated elements supported by dielectric material, the value of each charge being dependent on the intensity of the light received from the corresponding elemental area of the picture projected on the photosensitive member, and controlling the intensity of an electric flow in accordance with the charges, while maintaining the said insulating properties of the dielectric material substantially constant.

28. The method of electrical image transmission which comprises projecting the light of a plurality of elemental areas of an image on a plurality of mutually insulated photoelectric elements to cause electron emission from said elements, picking up said emission thus to cause each element to acquire a charge dependent upon the amount of light projected on it from a corresponding elemental area of the image, and scanning the same surfaces of said elements as those on which said light is projected with a scanning spot having energy releasing power of substantially the same order of magnitude as that of the light from the entire image projected on the elements.

29. The method of electrical image transmission which comprises the steps of photoelectrically producing an electrical image comprising a plurality of separate and distinct electrostatic charges upon a series of mutually insulated elements supported by dielectric material, the value of each charge being dependent upon the intensity of light received from corresponding elemental areas of a light image initiating the photoelectric effect, and controlling the intensity of an electric flow in accordance with the charges while maintaining the insulating properties of the dielectric material substantially constant.

30. The apparatus for electrical image transmission which comprises means for photoelectrically producing an electrical image comprising a plurality of separate and distinct electrostatic charges upon a series of mutually insulated elements supported by dielectric material, the value of each charge being dependent upon the intensity of light received from corresponding elemental areas of a light image initiating the photoelectric effect, and means for controlling the intensity of an electric flow in accordance with the charges while maintaining the insulating properties of the dielectric material substantially constant.

31. In apparatus wherein there is provided a series of mutually insulated storage elements supported by dielectric material, the method of electrical image transmission which comprises the steps of simultaneously photoelectrically translating the characteristics of the elemental areas of an image into electrostatic charges and sequentially translating the electrostatic charges into electrical signalling impulses while maintaining the insulating properties of the dielectric material substantially constant.

32. In apparatus wherein there is provided a series of mutually insulated storage elements supported by dielectric material, the method of electrical image transmission which comprises the steps of simultaneously photoelectrically translating the characteristics of the elemental areas of an image into electrostatic charges, scanning the isolated areas according to a predetermined pattern of scanning and sequentially translating the electrostatic charges, in accordance with the scanning pattern, into electrical signalling impulses while maintaining the insulating properties of the dielectric material substantially constant.

33. In apparatus wherein there is provided a series of mutually insulated storage elements supported by dielectric material, the method of electrical image transmission which comprises the steps of simultaneously producing discrete electrostatic charges representing the light values of separate elemental areas of an image and sequentially translating the electrostatic charges into electrical signalling impulses, while maintaining the insulating properties of the dielectric material substantially constant.

34. In apparatus wherein there is provided a series of mutually insulated storage elements supported by dielectric material, the method of electrical image transmission which comprises the steps of simultaneously producing discrete electrostatic charges representing the light values of separate elemental areas of an image, sequentially producing currents whose intensity depends solely on the discrete stored charges while maintaining the insulating properties of the dielectric material substantially constant, and producing signalling impulses from said currents.

35. The method of electrical image transmission which comprises projecting the light of a plurality of elemental areas of an image on a plurality of mutually insulated photoelectric elements to cause electron emission from said elements, picking up said emission thus to cause each element to acquire a charge dependent upon the amount of light projected on it from a corresponding elemental area of the image, and scanning said elements from the same side as that from which said light is projected with a scanning spot having energy releasing power of substantially the same order of magnitude as that of the light from the entire image projected on the elements.

36. The apparatus for electrical image transmission which comprises a plane surface of dielectric material, a plurality of mutually insulated photoelectric elements supported by said material, means for projecting an image on said elements to produce an electrical image comprising a plurality of separate and distinct electrostatic charges, the value of each charge being dependent upon the intensity of light received from corresponding elemental areas of a light image initiating the photoelectric effect, and means for controlling the intensity of an electric flow in accordance with the charges while maintaining the insulating properties of the dielectric material substantially constant.

37. In the method of electrical image transmission, the steps which comprise projecting an image upon a plurality of mutually insulated photoelectric elements supported by dielectric material to produce discrete electrostatic charges representing the intensities of corresponding elemental areas of the image, interrupting the image projection subsequent to the production of the electrostatic charges, and thereafter scanning the electrostatic charge image to produce signalling impulses.

38. In the method of electrical image transmission, the steps which comprise projecting a light image upon a plurality of mutually insulated photoelectric elements supported by dielectric material to produce discrete electrostatic charges representing the intensities of corresponding elemental areas of the projected image, scanning the electrostatic charge image to produce signalling impulses measured in magnitude by the charge magnitudes, and alternating the steps of light image projection and scanning so that complete image projection and complete scansion occur successively.

39. The method of electrical image transmission which comprises the steps of projecting the light of an image simultaneously upon each of a series of mutually insulated photoelectric elements supported by dielectric material, producing from the image projection a flow of photoelectrons representing the integrated light values of all elemental areas of the image to cause thereby the production of discrete electrostatic charges representative of elemental areas of the image falling upon each mutually insulated photoelectric element, and scanning the charged elements, while maintaining the insulating properties of the dielectric material substantially constant, to produce an electric current flow.

40. In the method of electrical image transmission, the steps which comprise projecting a light image upon a plurality of photoelectric elements, producing in accordance with the photoelectric effect initiated thereby discrete electrostatic charges determined in magnitude by the intensities of corresponding elemental areas of the light image during the projection period, interrupting the light image projection, and then translating the electrostatic charges into electric signalling impulses.

FRANÇOIS CHARLES PIERRE HENROTEAU.